United States Patent [19]

Harlow, Jr.

[11] Patent Number: 5,064,385
[45] Date of Patent: Nov. 12, 1991

[54] STATION BAR

[76] Inventor: Thomas L. Harlow, Jr., 8414 Three Chopt Rd., Richmond, Va. 23229

[21] Appl. No.: 567,744

[22] Filed: Aug. 15, 1990

Related U.S. Application Data

[63] Continuation-in-part of Ser. No. 262,688, Oct. 26, 1988, Pat. No. 4,976,631.

[51] Int. Cl.⁵ ............................................. H01K 13/60
[52] U.S. Cl. ..................................... 439/535; 174/53; 29/857
[58] Field of Search ..................... 439/535; 174/48, 53; 29/857

[56] References Cited

U.S. PATENT DOCUMENTS

| | | | |
|---|---|---|---|
| 2,410,287 | 10/1946 | Jaberg | 174/53 |
| 3,922,478 | 11/1975 | Perkey | 174/53 |
| 4,336,418 | 6/1982 | Hoag | 439/535 X |
| 4,627,675 | 12/1986 | Taylor | 439/535 X |
| 4,875,871 | 10/1989 | Booty et al. | 439/535 X |
| 4,918,258 | 4/1990 | Ayer | 174/53 |

Primary Examiner—Eugene F. Desmond

[57] ABSTRACT

A station bar, composed of at least one part molded from a resilient, high impact, heat resistant, dielectric plastic material, is capable of being connected to at least one multi-conductor electrical cable to function as a junction bar, receptacle, switch or base connector for a light fixture, service heads, circuit breakers, service entrance panels, meters etc., through the use of contact terminals, connector plugs and connector jacks contained in or on the parts of the station bar thereby eliminating the use of an outlet or junction box and associated wiring methods.

3 Claims, 12 Drawing Sheets

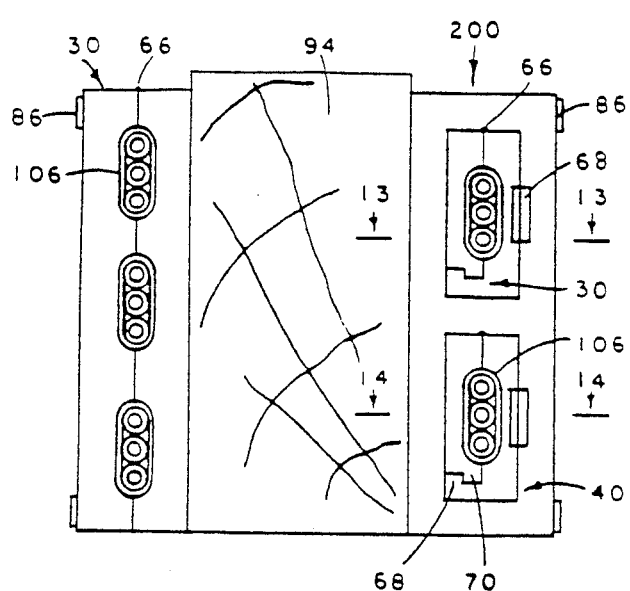
FIG. 10
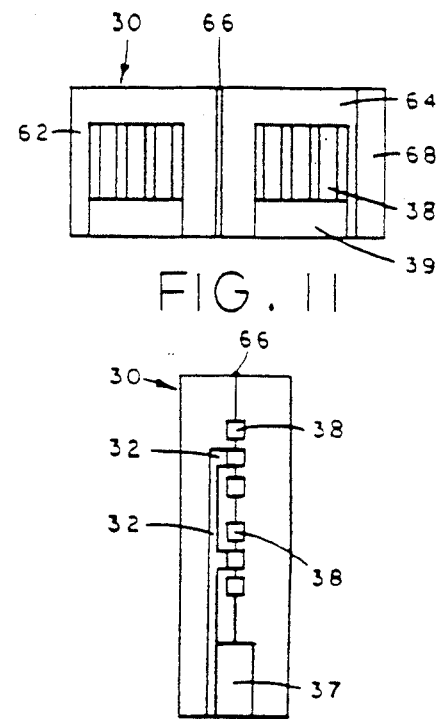
FIG. 11
FIG. 12
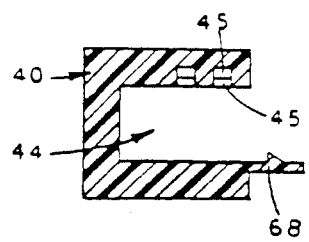
FIG. 13
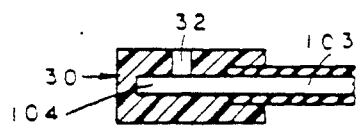
FIG. 14
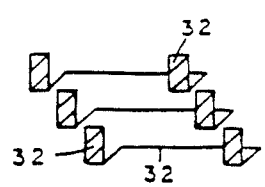
FIG. 15
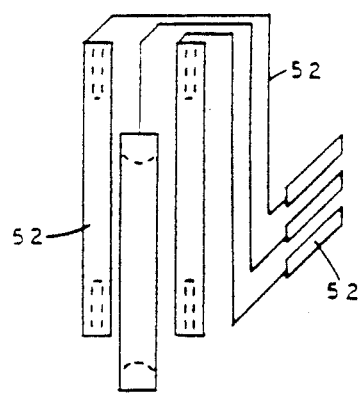
FIG. 16

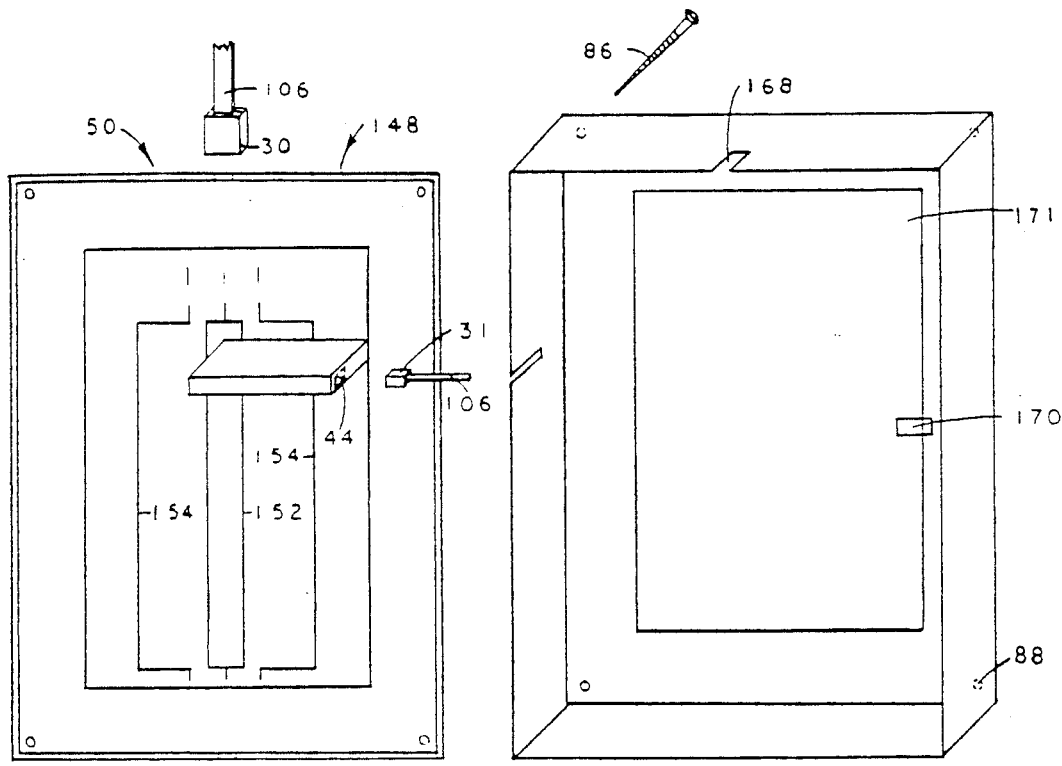
FIG. 24
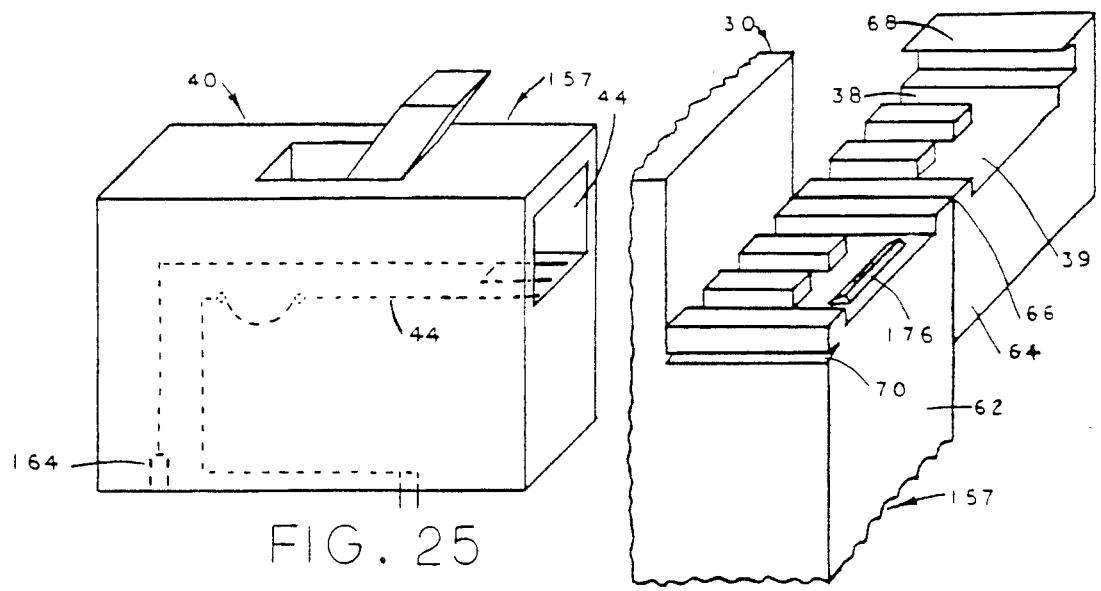
FIG. 25
FIG. 26

STATION BAR

REFERENCE TO RELATED APPLICATION

This is a continuation-in-part of application Ser. No. 262,688, filed Oct. 26,1988, now Pat. No. 4,976,631.

FIELD OF THE INVENTION

This invention relates to electrical components such as receptacles, switches, etc. which can be easily connected to multi-conductor electrical cables and fastened directly to the framing members of structures without the use of outlet or junction boxes. Also this invention relates to the connection between multi-conductor electrical cables and electrical components of electrical wiring systems including but not limited to power distribution, control/data signal distribution and audio/video signal distribution.

BACKGROUND OF THE INVENTION

Conventional methods of wiring a structure consist of attaching an outlet or junction box to the framing member of a structure, running cables through the openings on the box, folding the cables back into the box, measuring the position of the box on the sheetrock, cutting an opening in the sheetrock, fastening the weakened sheetrock to the framing member, removing the insulation from the ends of the individual conductors of the cables, fastening each conductor to each terminal on the wiring device, pushing the multitude of conductors and wiring device into the box and attaching the wiring device to the box with bolts. Also electrical components such as service heads, meters, circuit breakers, service entrance panels, etc. are wired by the conventional method of running cables through the openings on the devices, removing the insulation from the ends of the individual conductors of the cables, bending the individual cables around in the limited space and fastenings each conductor to each terminal on the wiring device. This is a time consuming, expensive, error prone and awkward method of wiring a structure.

SUMMARY OF THE INVENTION

The station bar, designed to be easily molded by using conventional injection molding techniques, incorporates all the elements of an electrical connection and wiring device into a solid bar made of at least one part and molded from a resilient, high impact, heat resistant, dielectric, plastic material with the contact terminals held by or embedded in the plastic material making up the station bar. The present invention may be utilized as a receptacle, switch, base connection bar for a light fixture or connection bar for a multiplicity of electrical cables by changing the internal wiring and configuration of the station bar. The station bar is attached directly to the framing member of a structure. The purpose of the present invention is to eliminate the outlet or junction box in most wiring systems by replacing it with the station bar, and to present a simple and efficient method of locating the multi-conductor electrical cables and unit or units of the station bar attached to the cables when they are covered by a finishing material and out of sight, thereby eliminating almost half of the procedure steps in the process of wiring a structure.

Also it is ann object of the present invention to make the wiring of a structure less time consuming, expensive, error prone and awkward.

Still another intention is too eliminate the measuring of the location of the outlet box, measuring the position on the finishing material and cutting an opening in the finishing material before it is applied to the framing members of a structure.

Another aim of the present invention is to eliminate the multitude of tangled conductors and exposed electrical terminals in the outlet or junction box which are a source of device breakage, electrical shorts, disconnections and wire breakage.

BRIEF DESCRIPTION OF THE DRAWINGS

The invention will be more readily understood when viewed with the following drawings wherein:

FIG. 10 is a top view of the first unit and second unit in the form of an interconnecting device for a plurality of multi-conductor electrical cables;

FIG. 11 is a plan view of the open first unit of FIG. 10; FIG. 12 is a sectional view of the first unit taken along line 12—12 of FIG. 5;

FIG. 13 is a sectional view of the second unit of FIG. 10 taken along line 13—13 of FIG. 10;

FIG. 14 is a sectional view of the first unit of FIG. 10 taken along line 14—14 of FIG. 10;

FIG. 15 is a schematic diagram of the interior wiring of the first unit of FIG. 10 and the second unit of FIG. 10;

FIG. 16 is a schematic diagram of the interior wiring of the third unit in the form of a receptacle outlet;

FIG. 24 is an exploded perspective view of a circuit breaker panel illustrating some of the many uses of the present invention;

FIG. 25 is a perspective view of an embodiment of the second unit of the station bar inn the form of a circuit breaker;

FIG. 26 is a perspective view of an embodiment of the first unit of the station bar in the form of a circuit breaker.

DRAWING REFERENCE NUMERALS

Figure 1:
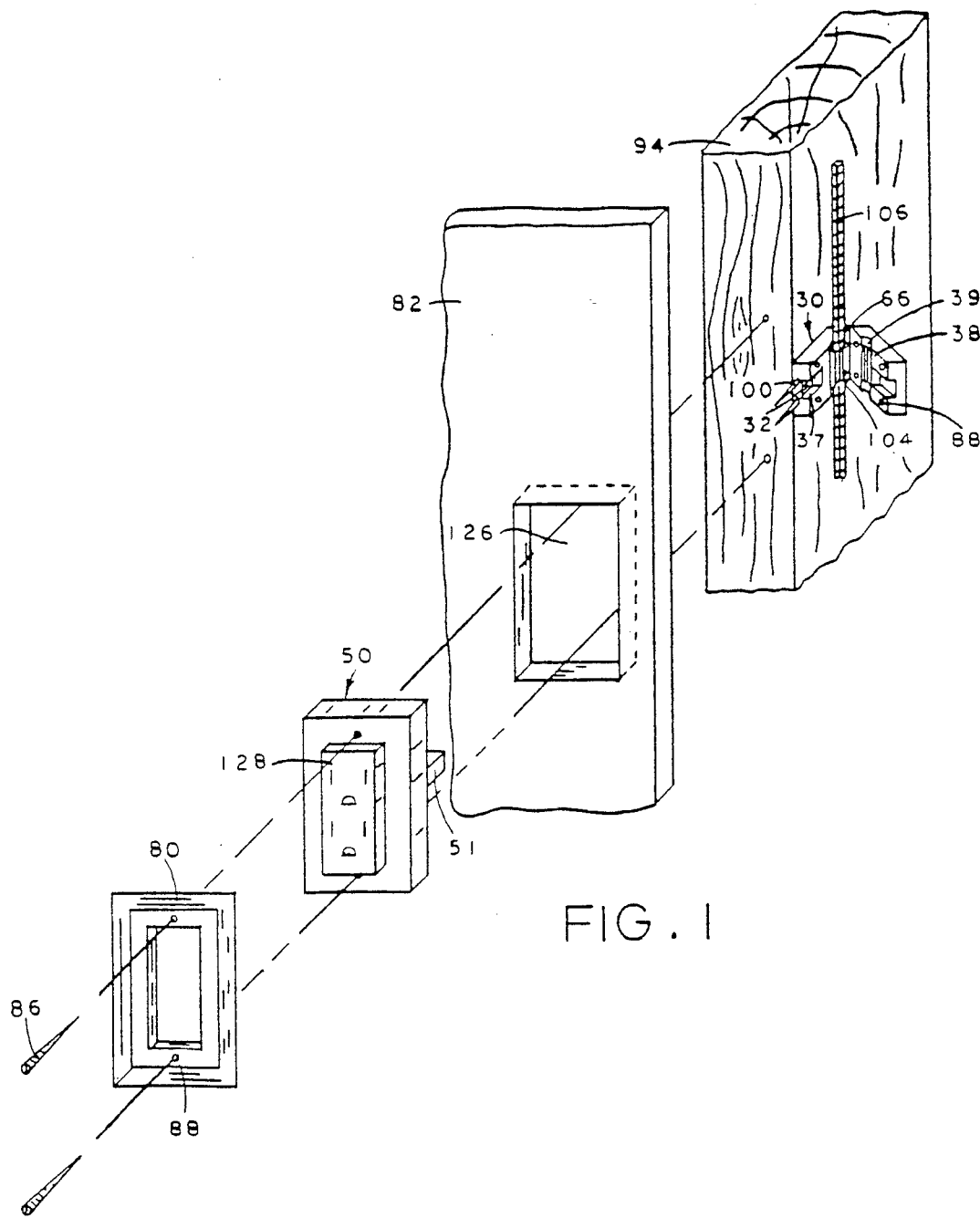
FIG. 1 is an exploded perspective view of the station bar, in the form of a receptacle, illustrating one method of connecting the receptacle to multi-conductor electrical cables.
Figure 2:
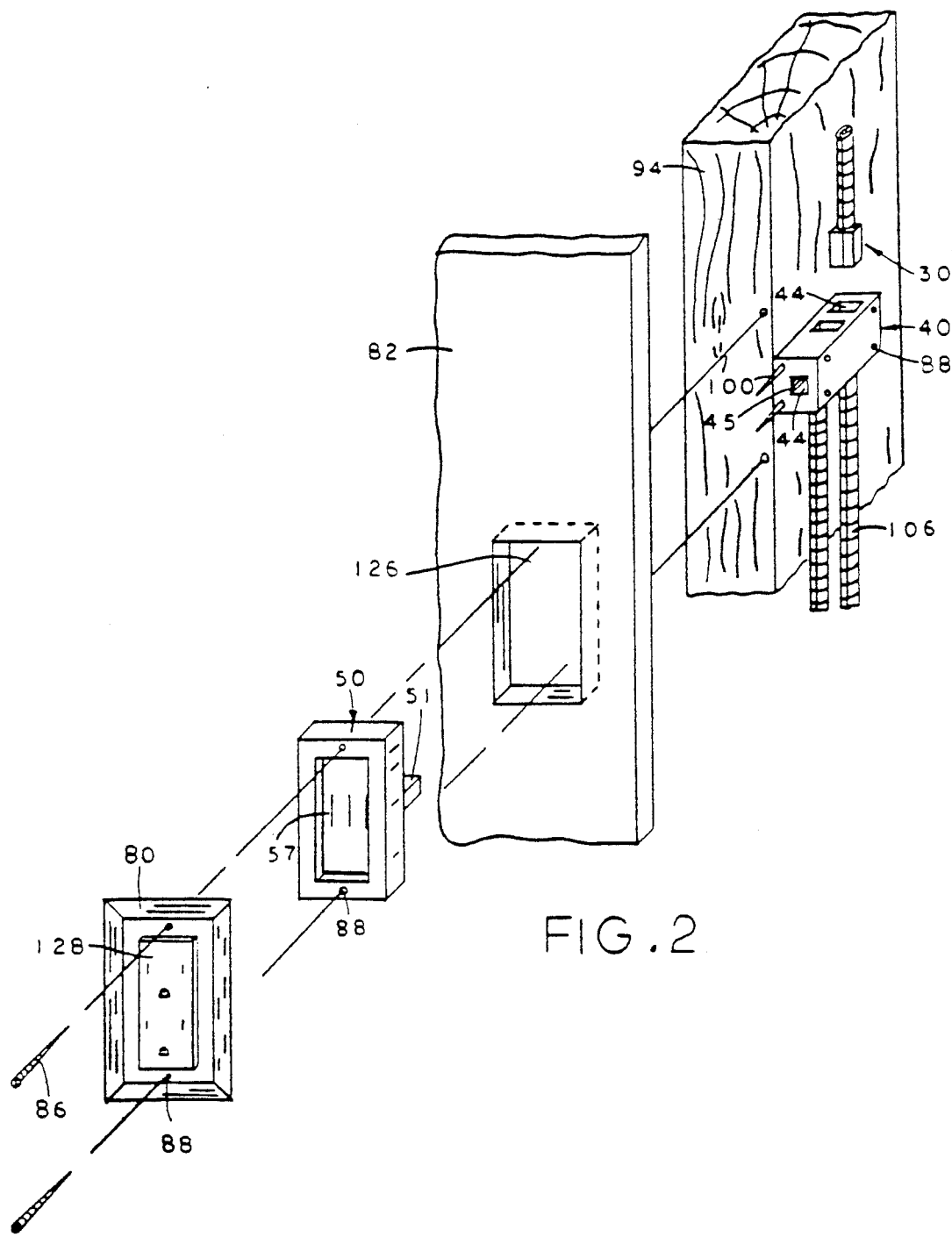
FIG. 2 is an exploded perspective view of the station bar in the form of a receptacle, illustrating another method of connecting the receptacle to multi-conductor electrical cables.
Figure 3:
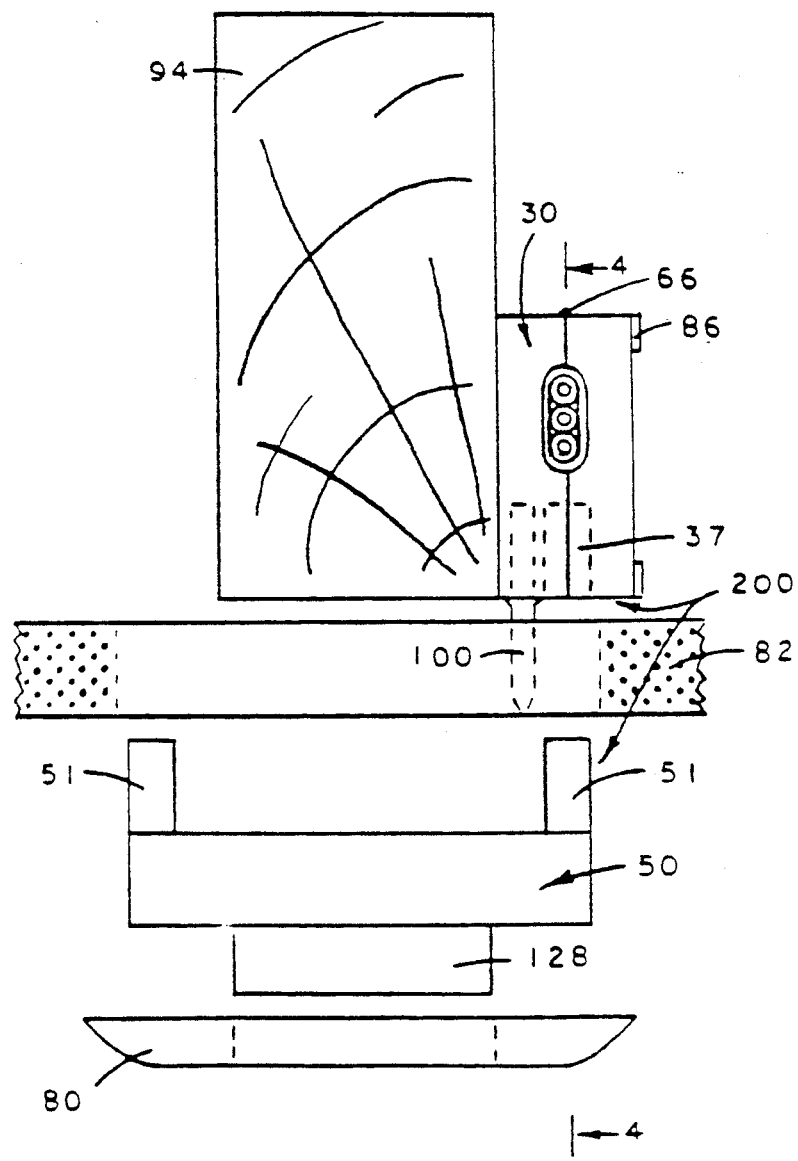
FIG. 3 is an exploded top view of the station bar in the form of a receptacle, illustrating a two plug third unit.
Figure 4:
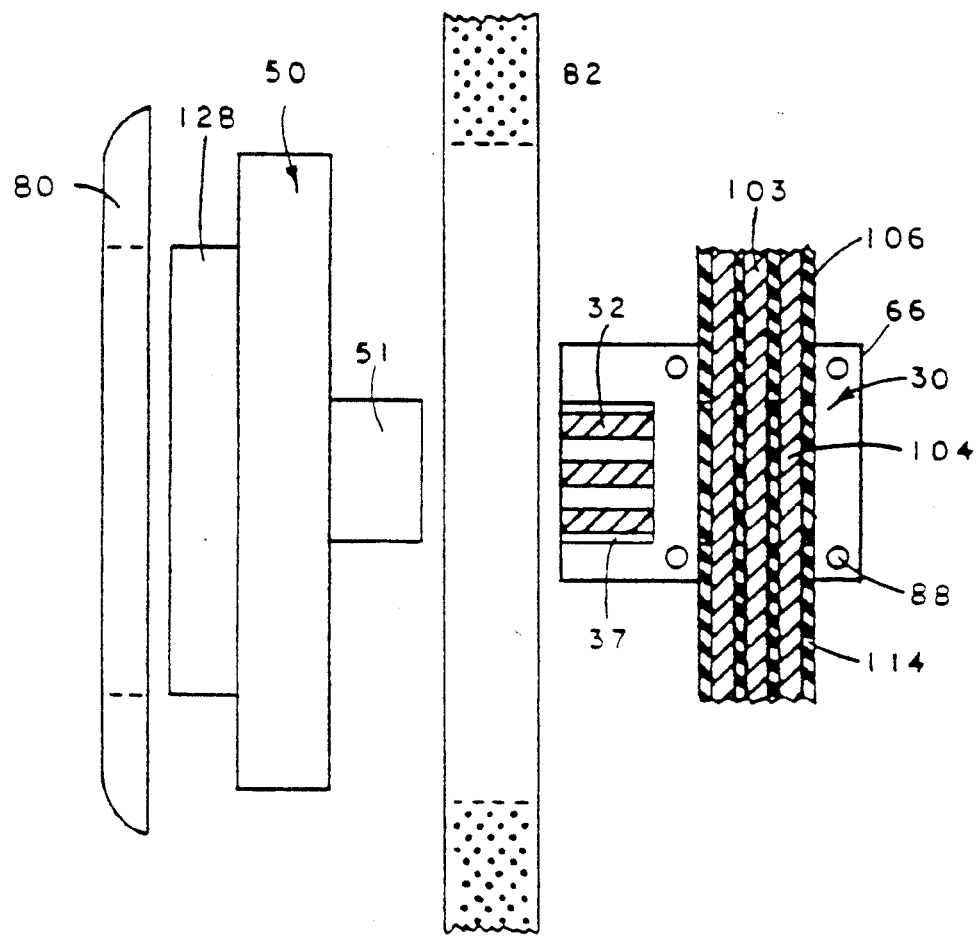
FIG. 4 is a sectional view taken along line 4—4 of FIG. 3.
Figure 5:
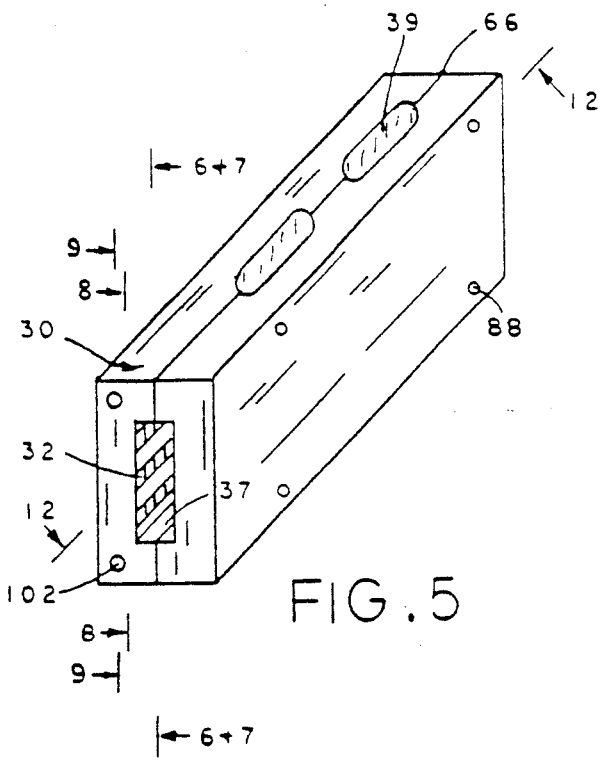
FIG. 5 is a perspective view of an embodiment of the first unit of the station bar.
Figures 6, 7:
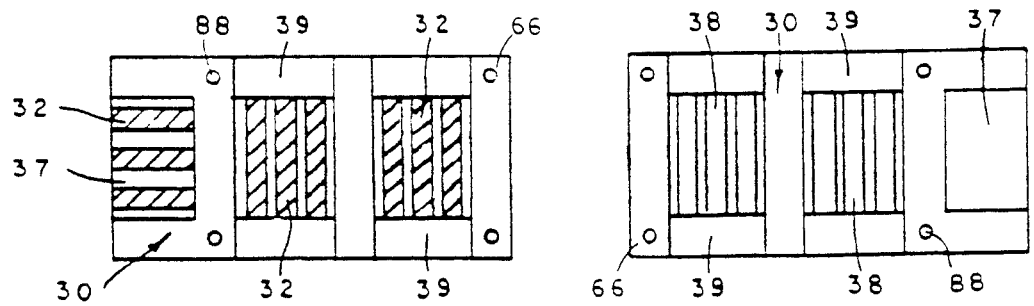
FIG. 6 is a plan view of the first unit taken along line 6—6 of FIG. 5.
FIG. 7 is a plan view of the first unit taken along line 7—7 of FIG. 5.
Figure 8:
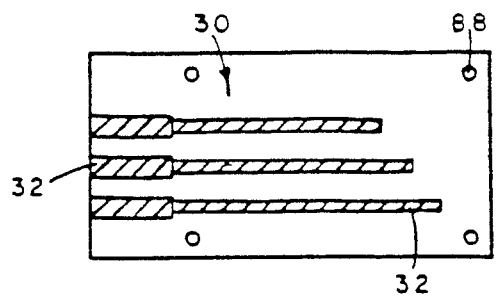
FIG. 8 is a sectional view of the first unit taken along line 8—8 of FIG. 5.
Figure 9:
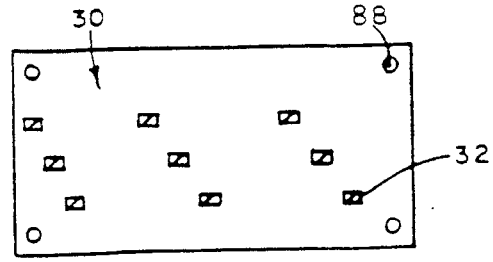
FIG. 9 is a sectional view of the first unit taken along line 9—9 of FIG. 5.
Figure 17:
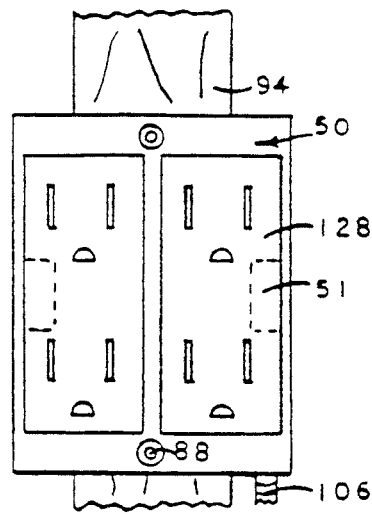
FIG. 17 is a front elevation view of the third unit in the form of a two gang receptacle outlet.

30 —first unit
31 —first connector plug
32 —first contact terminal
37 —first connector jack
38 —first small channel
39 —first large channel
40 —second unit
43 —second connector plug
44 —second connector jack
45 —second contact terminal
50 —third unit
51 —third connector plug
52 —third contact terminal
57 —third connector jack
62 —body
64 —lid
66 —hinge
68—hook member
69—fourth connector plug
70—latch member
72—ridge
80—wallplate
82—sheetrock
86—screw
88—opening for receiving a screw
94—framing member
100—position marking spike
102—opening for receiving a spike
103—insulated conductor
104—un-insulated conductor
106—multi-conductor electrical cable
114—insulation
116—sheath
126—opening in the sheetrock
128—receptacle
130—rocker switch
132—base connecting bar for a lighting fixture
134—service entrance conductors
136—service line drop
142—meter
148—service entrance panel
152—neutral bus bar
154—hot bus bar
157—circuit breaker
164—mounting clip
168—slot
170—latch
171—door
174—marking and cutting box
176—ridge
180—vertical member
182—horizontal member
186—spike
200—station bar
300—insulation removing tool
302—jaw
304—upper handle
306—lower handle
308—blade
310—opening
312—slot
314—upper blade head
316—lower blade head
318—bolt

DESCRIPTION OF THE PREFERRED EMBODIMENT

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

1. Overall

FIGS. 1, 2, 3, 4 and 10 illustrate the principal components of the station bar 200 which may include the following:

A hinged first unit 30 which may contain at least one body 62, at least one lid 64, at least one latch member 70, at least one hook member 68, at least one first connector jack 37, at least one first connector plug 31, at least one opening 102 for receiving a position marking spike 100, at least one first large channel 39 for receiving a measured portion of an insulated multi-conductor electrical cable 106, at least one first small channel 38 for receiving a measured portion of an un-insulated conductor 104 from an insulated multi-conductor electrical cable 106, at least one electrically conductive first contact terminal 32, at least one switch 130, at least one receptacle 128, at least one opening 88 for receiving a screw 86, or other appropriate fastening means, to attach a lighting fixture to the first unit and at least one opening 88 for receiving a screw 86, or other appropriate fastening means, to attach the first unit 30 to the framing member 94 of a structure.

A second unit 40 which may contain at least one second connector plug 43, at least one second connector jack 44, at least one hook member 68, at least one electrically conductive second contact terminal 45, at least one opening 102 for receiving a position marking spike, and at least one opening 88 for receiving a screw 86, or other appropriate fastening means, to attach the second unit 40 to the framing member 94 of a structure.

A third unit 50 which may contain at least one third connector jack 57, at least one third connector plug 51, at least one electrically conductive third contact terminal 52, at least one wallplate 80, at least one opening 88 for receiving a screw 86, or other appropriate fastening means, to attach the third unit 50 and wallplate 80 to the framing member 94 of a structure, at least one hook member 68, at least one switch 130, at least one receptacle 128 and at least one opening 88 for fastening a light fixture 132 to the third unit 50.

2. First Embodiment

Figure 20:
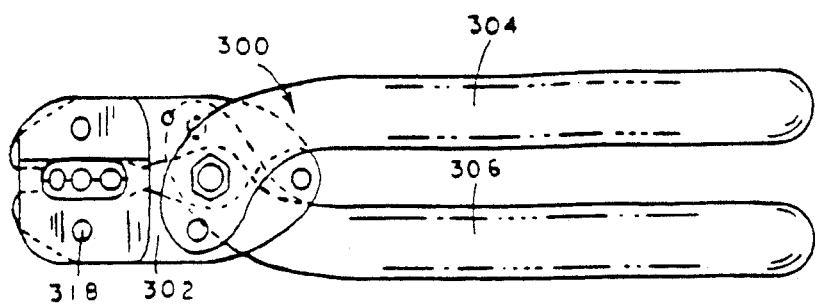
FIG. 20 is a side elevation view of the insulation removing tool.
Figure 22:
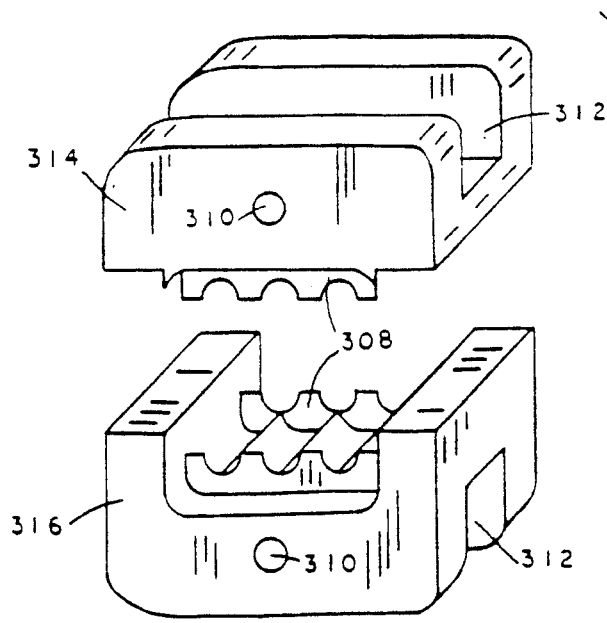
FIG. 22 is a perspective view of the replaceable blade heads of the tool of FIG. 20 which remove the insulation from an uncut section of a multi-conductor electrical cable.
Figure 23:
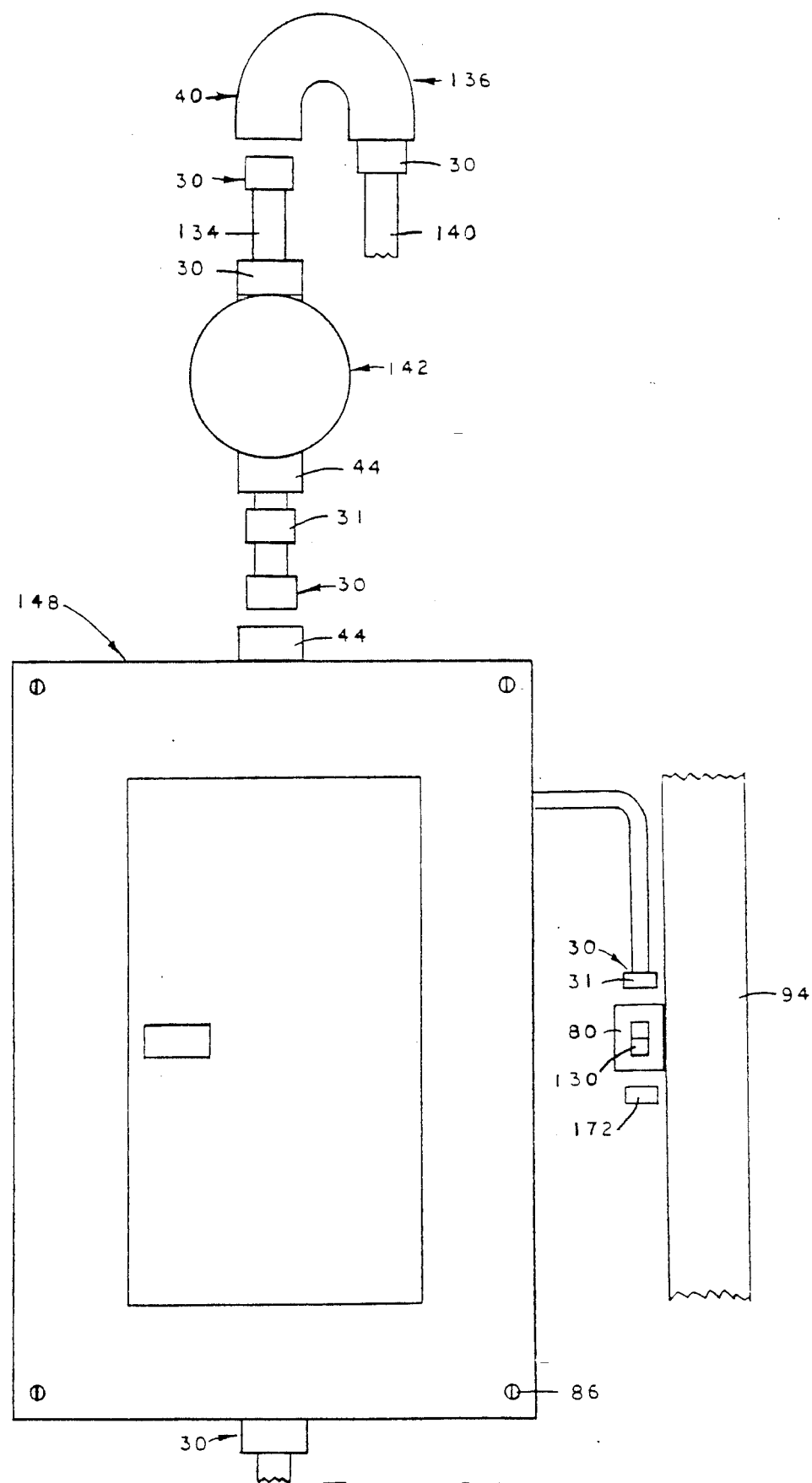
FIG. 23 is a perspective view illustrating some of the many uses of the present invention in wiring systems.
Figure 27:
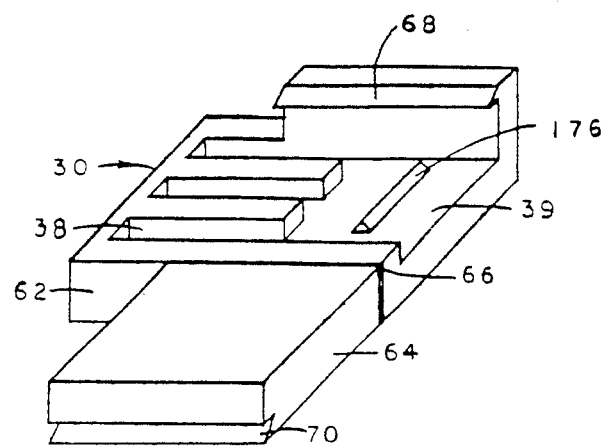
FIG. 27 is a perspective view of an embodiment of the first unit of the station bar.

The detailed construction of the first embodiment of the station bar 200 is shown in FIGS. 10 and 15. The hinged body 62 and lid 64 of the first unit 30 contain at least a primary group and a secondary group of first small channels 38 to receive the individual un-insulated conductors 104 of the insulated multi-conductor electrical cables 106, an electrically conductive first contact terminal 32 lining each first small channel 38, a first large channel 39 at each end of the primary, secondary, tertiary, and so on groups of first small channels 38 to receive a portion of the insulated multi-conductor electrical cables 106 and at least one opening 88 for receiving at least one screw 86, or other appropriate fastening means, for attaching the first unit 30 to the framing member 94 of a structure. Each first contact terminal 32 lining each first small channel 38 of the primary group of first small channels 38 extends to an associated one of the first contact terminals 32 lining an associated first small channel 38 of the secondary, tertiary, and so on, groups of first small channels 38 contained on the hinged body 62 of the first unit 30. Each first contact terminal 32 is separated from each other first contact terminal 32 by the dielectric material making up the hinged body 62 of the first unit 30. A measured portion of insulation 114 is removed from a plurality of multi-conductor electrical cables 106 using an insulation removing tool (see FIGS. 20 and 22). The replaceable upper blade head 314 and lower blade head 316 are constructed so that the blades 308 make multiple cuts through the insulation both parallel and perpendicular to the conductors 103 contained in the multi-conductor electrical cable 106 without nicking or severing the conductors 104. Each individual measured portion of un-insulated conductor 104 of each multi-conductor electrical cable 106 is inserted into an associated first small channel 38 of the body 62 of the first unit 30 and a measured portion of each insulated multiconductor electrical cable 106 is inserted into an associated first large channel 39 of the hinged body 62 of the first unit 30. The hinged lid 64 of the first unit 30, containing the identical size and number of first small channels 38 and first large channels 39 of the body 62 of the first unit 30, is mated with the body 62 of the first unit 30, thereby holding and pressing the individual un-insulated conductors 104 against an associated one of the first contact terminals 32 lining each individual first small channel 38 of the body 62 of the first unit 30 and each un-insulated conductor 104 of the primary group of un-insulated conductors 104 of the primary multi-conductor electrical cable 106 is electrically connected to the associated one of an un-insulated conductor 104 of the secondary, tertiary, and so on, groups of un-insulated conductors 104 contained in each secondary, tertiary, and so on, multi-conductor electrical cable 106. The mated body 62 and lid 64 of the first unit 30 are attached to the framing member 94 of a structure with at least one screw 86, or other appropriate fastening means, inserted through at least one opening 88 contained on the first unit 30.

3. Second Embodiment

Figure 21:
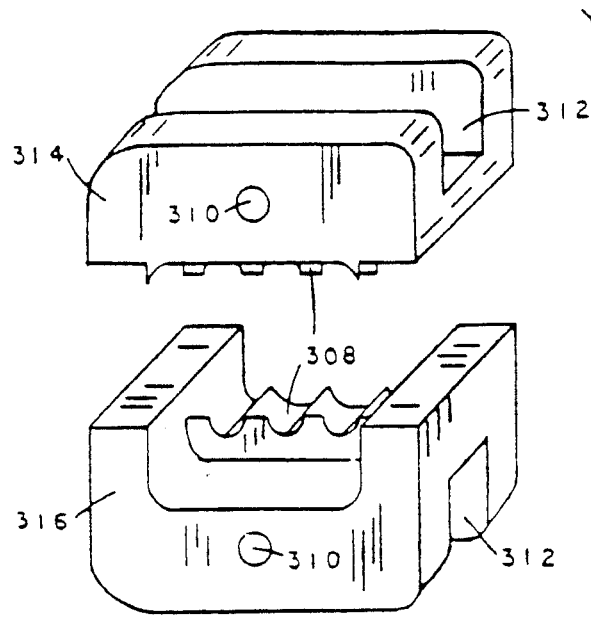
FIG. 21 is a perspective view of the replaceable blade heads of the tool of FIG. 20 which remove the insulation from the cut end of a multi-conductor electrical cable.

The detailed construction of the second embodiment of the station bar 200 is shown in FIGS. 10, 11, 13, 14 and 15. The hinged body 62 and lid 64 of the dielectric first unit 30 contain at least one hook member 68, at least one latch member 70, at least one electrically conductive first contact terminal 32, at least one first large channel 39 and at least one small channel 38. Each first contact terminal 32 lining an associated first small channel 38 of the body 62 of the first unit 30 extends from the associated one of each first small channel 38 to an associated portion of one external surface of the body 62 of the first unit 30. Each first contact terminal 32 is separated from each other first contact terminal 32 by the dielectric material making up the body 62 of the first unit 30. The rigid dielectric second unit 40 contains at least one hook member 68, at least two second connector jacks 44, at least one electrically conductive second contact terminal 45 and at least one opening 88 to receive a screw 86, or other appropriate fastening means. Each second contact terminal 45, lining a portion of one external surface of the primary second connector jack 44, extends from that portion of one surface of the primary second connector jack 44 to an associated portion of one external surface of the secondary, tertiary, and so on, second connector jacks 44. Each second contact terminal 45 is separated from each other second contact terminal 45 by the dielectric material making up the second unit 40. The second unit 40 is attached to the framing member 94 of a structure with at least one screw 86, or other appropriate fastening means, inserted into at least one opening 88 contained on the second unit 40. The insulation 114 is removed from the ends of a plurality of multi-conductor electrical cables 106 using an insulation removing tool 300 (see FIGS. 20 and 21) and the following procedure is performed on each multi-conductor electrical cable 106 being attached to each first unit 30 being inserted into each second connector jack 44 of the second unit 40. Each individual measured portion of un-insulated conductor 104 of the multi-conductor electrical cable 106 is inserted into an associated first small channel 38 of the body 62 of the first unit 30 and a measured portion of the insulated multi-conductor electrical cable 106 is inserted into the first large channel 39 of the body 62 of the first unit 30. The lid 64 of the first unit 30, containing the identical size and number of first small channels 38 and first large channels 39 of the body 62 of the first unit 30, is mated with the body 62 of the first unit 30 and the hook member 68 of the lid 64 engages the latch member 70 of the body 62 thereby firmly holding and pressing each individual un-insulated conductors 104 against an associated one of the first contact terminals 32 lining each associated first small channel 38 of the body 62 of the first unit 30. A plurality of first units 30, each containing the un-insulated conductors 104 of a multi-conductor electrical cable 106, are inserted into a plurality of second connector jacks 44 contained on the second unit 40 and each first unit 30 is held firmly in place by at least one hook member 68 contained on the second unit 40. Each first contact terminal 32 of each first unit 30 is placed in firm electrical contact with an associated second contact terminal 45 contained on a portion of one surface of each second connector jack 44 of the second unit 40 thereby electrically connecting each un-insulated conductor 104 of the primary multi-conductor electrical cable 106 with an associated one of the un-insulated conductors of the secondary, tertiary, and so on, multi-conductor electrical cables 106.

4. Third Embodiment

Figure 18:
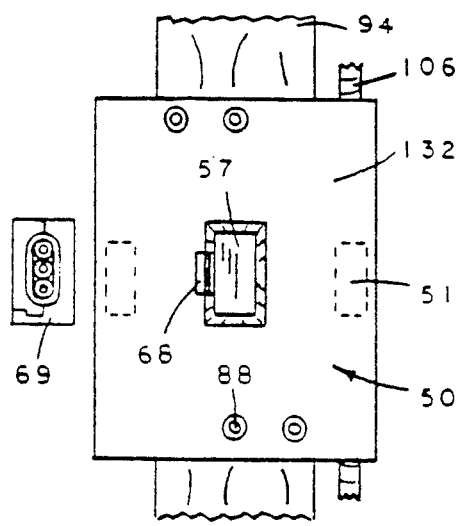
FIG. 18 is a front elevation view of the third unit in the form of a base connecting bar for a lighting fixture.
Figure 19:
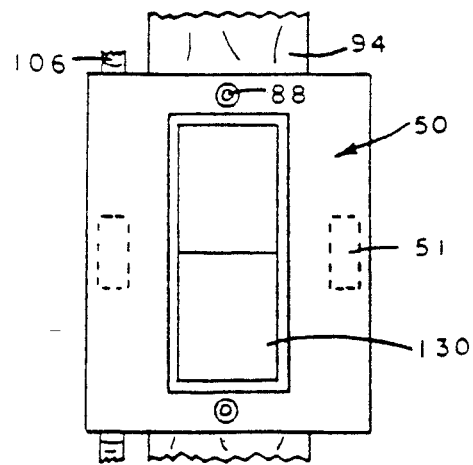
FIG. 19 is a front elevation view of the third unit in the form of a switch.

The detailed construction of the third embodiment of the station bar 200 is shown in FIGS. 1, 3, 4, 5, 6, 7, 8, 9, 12, 15, 16, 17, 18 and 19. The hinged body 62 and the lid 64 of the dielectric first unit 30 contain at least a primary group and a secondary group of first small channels 38 to receive the individual un-insulated conductors 104 of the insulated multi-conductor electrical cables 106, an electrically conductive first contact terminal 32 lining each first small channel 38, a first large channel 39 at each end of the primary, secondary, tertiary, and so on, groups of first small channels 38 to receive a portion of the insulated multi-conductor electrical cable 106, at least one first connector jack 37, or at least one first connector plug 31, at least one opening 102 for receiving a position marking spike 100 and at least one opening 88 for receiving at least one screw 86, or other appropriate fastening means, for attaching the first unit 30 to the framing member 94 of a structure. Each first contact terminal 32 lining each first small channel 38 of the primary group of the first small channels 38 extends to an associated one of the first contact terminals 32 lining an associated first small channel 38 of the secondary, tertiary, and so on, groups of first small channels 38 contained on the hinged body 62 of the first unit 30. Each first contact terminal 32 is separated from each other first contact terminal 32 by the dielectric material making up the body 62 of the first unit 30. The rigid dielectric third unit 50 contains at least one electrically conductive third contact terminal 52, at least one third connector plug 51 or at least one third connector jack 57, at least one hook member 68, at least one opening 88 for receiving a screw 86, or other appropriate fastening means and either a receptacle 128, a switch 130 or at least one third connector jack 57 to receive a fourth connector plug 69 from a lighting fixture. A measured section of insulation 114 making up the sheath 116 and covering the individual conductors 103 of a multi-conductor electrical cable 106 is removed from a plurality of multi-conductor electrical cables 106 using an insulation removing tool 300 (see FIGS. 2 and 22). Each un-insulated conductor 104 of the primary group of un-insulated conductors 104 of the primary multi-conductor electrical cable 106 is inserted into an associated first small channel 38 of the primary group of first small channels 38 of the body 62 of the first unit 30 and each un-insulated conductor 104 of the secondary, tertiary, and so on, groups of un-insulated conductors 104 of the secondary, tertiary, and so on, multi-conductor electrical cables 106 is inserted into an associated first small channel 38 of the secondary, tertiary, and so on, groups of first small channels 38 of the body 62 of the first unit 30. The lid 64 of the first unit 30, containing the identical number of first small channels 38 and first large channels 39 of the body 62 of the first unit 30, is mated with the body 62 of the first unit 30. The mated body 62 and lid 64 of the first unit 30 are attached to the framing member 94 of a structure with at least one screw 86, or other appropriate fastening means, inserted through at least one opening 88 contained on the body 62 and the lid 64 of the first unit 30. At least one position marking spike 100 is inserted into at least one opening 102 on the first unit 30. Sheetrock 82, or other finishing material, is applied to the framing members 94 of the structure and an opening 126 is cut in the sheetrock 82, or other finishing material, directly over the framing member 94 and the first unit 30 at the location marked on the sheetrock 82 by the reusable and removable position marking spikes 100. The position marking spike 100 is removed from the opening 102 on the first unit 30. Simultaneously the third connector plug 51 of the third unit 50 is inserted into the first connector jack 37 of the first unit 30 and the third unit 50 is inserted into the opening 126 cut in the sheetrock 82, or other finishing material, directly over the framing member 94 and the first unit 30. A wallplate 80 and third unit 50 are attached to the framing member 94 of the structure with at least one aligned screw 86, or other appropriate fastening means, inserted through at least one aligned opening 88 contained on the wallplate 80 and third unit 50. In the embodiment of the present invention utilizing the receptacle 128, the switch 130 or the base connecting bar for a lighting fixture 132, each third contact terminal 52 of the third unit 50 extends from a portion of one external surface of the third connector plug 51 to an associated terminal of the receptacle 128 or switch 130 or to an associated portion of one external surface of the third connector jack 57 receiving the fourth connector plug 69 attached to the conductors 103 from a lighting fixture 132, contained on the third unit 50. Each third contact terminal 52 is separated from each other third contact terminal 52 by the dielectric material making up the third unit 50. Therefore when the third connector plug 51 of the third unit 50 is inserted into the first connector jack 37 of the first unit 30, or the first connector plug 31 of the first unit 30 is inserted into the third connector jack 57 of the third unit 50, the un-insulated conductors 104 of the multi-conductor electrical cable 106 are electrically connected to the appropriate terminals of the suitable electrical device because each third contact terminal 52 lining an associated portion of the external surface of the third connector plug 51 of the third unit 50 is pressed into contact with an associated first contact terminal 32 lining an associated portion of the external surface of the first connector jack 37 of the first unit 30 and each first contact terminal 32 lining an associated first small channel 38 of the primary group of first small channels 38 extends to an associated portion of the external surface of the first connector jack 37 of the first unit 30. I the embodiment of the present invention utilizing the receptacle 128 or the switch 130, a wallplate 80 is mated to the receptacle 128 or the switch 130 and the united wallplate 80 and the receptacle 128 or the switch 130 are fastened directly to the framing member 94 of a structure with at least one screw 86, or other appropriate fastening means, inserted through the aligned openings 88 on the wallplate 80 and the third unit 50. In the embodiment of the present invention utilizing the base connecting bar for a lighting fixture 132, the third unit 50 is attached directly to the framing member 94 of a structure with at least one screw 86, or other appropriate fastening means, inserted through at least one opening 88 on the third unit 50 and the lighting fixture 130 is attached to the third unit 50 with at least one screw 86, or other appropriate fastening means, inserted into at least one opening 88 on the third unit 50. Then the fourth connector plug 69 attached to the conductors from the lighting fixture 132 is inserted into the third connector jack 57 of the third unit 50. The conventional rocker switch 130 (see FIG. 18) is illustrated because the wallplate 80 is interchangeable with the receptacle 128 and the rocker switch 130 but any receptacle or switch in any combination may be contained by the third unit 50. Also the third unit 50 may be enlarged to contain two or more electrical devices in any combination.

5. Fourth Embodiment

The detailed construction of the fourth embodiment of the station bar 200 is shown in FIGS. 2, 10, 11, 13, 14, 15, 16, 17, 18 and 19. The hinged body 62 and lid 64 of the dielectric first unit 30 contain at least one first small channel 38, at least one first large channel 39, at least one electrically conductive first contact terminal 32, at least one hook member 68 and at least one latch member 70. Each first contact terminal 32 lining an associated first small channel 38 of the body 62 of the first unit 30 extends from the associated one of each first small channel 38 to an associated portion of one external surface of the body 62 of the first unit 30. Each first contact terminal 32 is separated from each other first contact terminal 32 by the dielectric material making up the body 62 of the first unit 30. The rigid dielectric second unit 40 contains at least one hook member 68, at least two second connector jacks 44, at least one electrically conductive second contact terminal 45, at least one opening 102 for receiving a position marking spike 100, and at least one opening 88 to receive a screw 86, or other appropriate fastening means, for attaching the second unit 40 to the framing member 94 of a structure. Each second contact terminal 45, lining a portion of one external surface of the primary second connector jack 44, extends from that portion of one surface of the primary second connector jack 44 to an associated portion of one external surface of the secondary, tertiary, and so on, second connector jacks 44. Each second contact terminal 45, of the primary second connector jack 44 extends from a portion of the external surface of the primary second connector jack 44 to an associated portion of the external surface of the second connector plug 43. Each second contact terminal 45 is separated from each other second contact terminal 45 by the dielectric material making up the second unit 40. The rigid dielectric third unit 50 contains, at least one hook member 68, at least one electrically conductive third contact terminal 52, at least one third connector plug 51, at least one opening 88 for receiving a screw 86, or other appropriate fastening means, and either a receptacle 128, a switch 130 or at least one third connector jack 57 to receive a fourth connector plug 69 from a lighting fixture. The insulation 114 is removed from the ends of a plurality of multi-conductor electrical cables 106 using an insulation removing tool 300 (see FIGS. 20 and 21), and the following procedure is performed on each multi-conductor electrical cable 106 being attached to each first unit 30 being inserted into each second connector jack 44 of the second unit 40. Each individual measured portion of un-insulated conductor 104 of the multi-conductor electrical cable 106 is inserted into an associated first small channel 38 of the body 62 of the first unit 30 and a measured portion of the insulated multi-conductor electrical cable 106 is inserted into the first large channel 39 of the body 62 of the first unit 30. The lid 64 of the first unit 30, containing the identical size and number of first small channels 38 and first large channels 39 as the body 62 of the first unit 30, is mated with the body 62 of the first unit 30 and the hook member 68 of the lid 64 engages the latch member 70 of the body 62 thereby firmly holding and pressing each individual un-insulated conductor 104 against an associated one of the first contact terminals 32 lining each associated first small channel 38 of the body 62 of the first unit 30. The second unit 40 is attached to the framing member 94 of a structure with at least one screw 86, or other appropriate fastening means, inserted into at least one opening 88 contained on the second unit 40. A plurality of first units 30, each containing the un-insulated conductors 104 of a multi-conductor electrical cable 106, are inserted into a plurality of second connector jacks 44 contained on the second unit 40 and each first unit 30 is held firmly in place by at least one hook member 68 contained on the second unit 40. Each first contact terminal 3 of each first unit 30 is placed in firm electrical contact with an associated second contact terminal 45 contained on a portion of one surface of each second connector jack 44 of the second unit 40 thereby electrically connecting each un-insulated conductor 104 of the primary multi-conductor electrical cable 106 with an associated one of the un-insulated conductors 104 of the secondary, tertiary, and so on, multi-conductor electrical cables 106. At least one position marking spike 100 is inserted into at least one opening 102 on the second unit 40. Sheetrock 82, or other finishing material, is applied to the framing members 94 of the structure and an opening 126 is cut in the sheetrock 82, or other finishing material, directly over the framing member 94 and the second unit 40 at the location marked on the sheetrock 82, or other finishing material, by the reusable and removable position marking spikes 100. The position marking spike 100 is removed from the opening 102 on the second unit 40. Simultaneously the third connector plug 51 of the third unit 50 is inserted into the second connector jack 44 of the second unit 40 and the third unit 50 is inserted into the opening 126 cut in the sheetrock 82, or other finishing material, directly over the framing member 94 and the second unit 40. A wallplate 80 and third unit 50 is attached to the framing member 94 of the structure with at least one screw 86, or other appropriate fastening means, inserted through at least one aligned opening 88 contained on the wallplate 80 and third unit 50. In the embodiment of the present invention utilizing the receptacle 128, the switch 130 or the base connecting bar for a lighting fixture 132, each third contact terminal 52 of the third unit 50 extends from a portion of one external surface of the third connector plug 51 to an associated terminal of the receptacle 128 or switch 130 or to an associated portion of one external surface of the third connector jack 57 receiving the fourth connector plug 69 attached to the conductors 103 from a lighting fixture 132 contained on the third unit 50. Each third contact terminal 52 is separated from each other third contact terminal 52 by the dielectric material making up the third unit 50. Therefore when the third connector plug 51 of the third unit 50 is inserted into the second connector jack 44 of the second unit 40, the un-insulated conductors 104 of the multi-conductor electrical cable 106 are electrically connected to the appropriate terminals of the suitable electrical device because each third contact terminal 52 lining an associated portion of the external surface of the third connector plug 51 of the third unit 50 is pressed into contact with an associated second contact terminal 45 lining an associated portion of the external surface of the second connector jack 44 of the second unit 40. In the embodiment of the present invention utilizing the receptacle 128 or the switch 130, a wallplate 80 is mated to the receptacle 128 or the switch 130 and the united wallplate 80 and the receptacle 128 or the switch 130 are fastened directly to the framing member 94 of a structure with at least one screw 86, or other appropriate fastening means, inserted through the aligned openings 88 on the wallplate 80 and the third unit 50. In the embodiment of the present invention utilizing the base connecting bar for a lighting fixture 132, the third unit 50 is attached directly to the framing member 94 of a structure with at least one screw 86, or other appropriate fastening means, inserted through at least one opening 88 on the third unit 50 and the lighting fixture 130 is attached to the third unit 50 with at least one screw 86, or other appropriate fastening means, inserted into at least one opening 88 on the third unit 50. Then the fourth connector plug 69 attached to the conductors from the lighting fixture 132 is inserted into the third connector jack 57 of the third unit 50. The conventional rocker switch 130 (see FIG. 18) is illustrated because the wallplate 80 is interchangeable with the receptacle 128 and the rocker switch 130 but any receptacle or switch in any configuration may be contained by the third unit 50. The third unit 50 may be enlarged to contain two or more devices in any combination.

6. Fifth Embodiment

Figure 28:
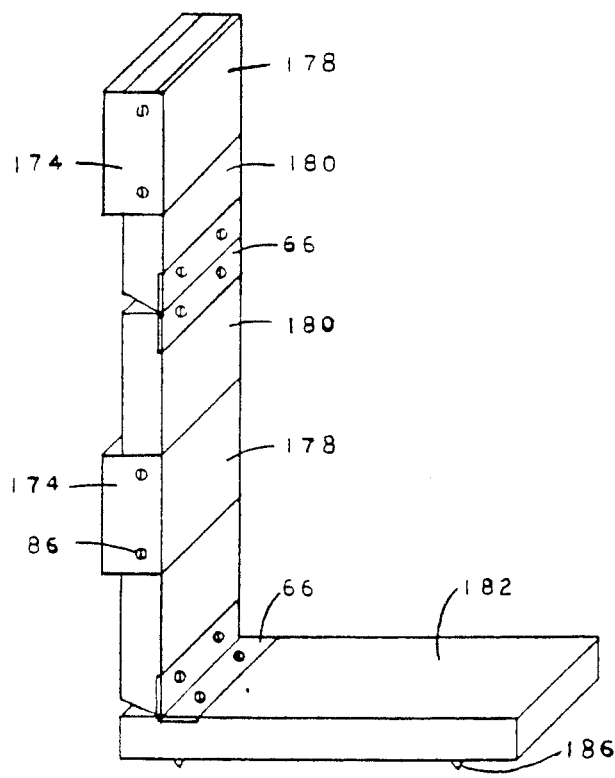
FIG. 28 is a perspective view of the tool used to attach a part of the station bar to the framing member of a structure and locate that part of the station bar after it is covered by a finishing material and cut an opening in the finishing material.
Figure 29:
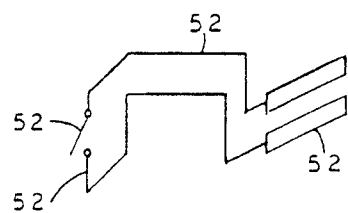
Figure 30:
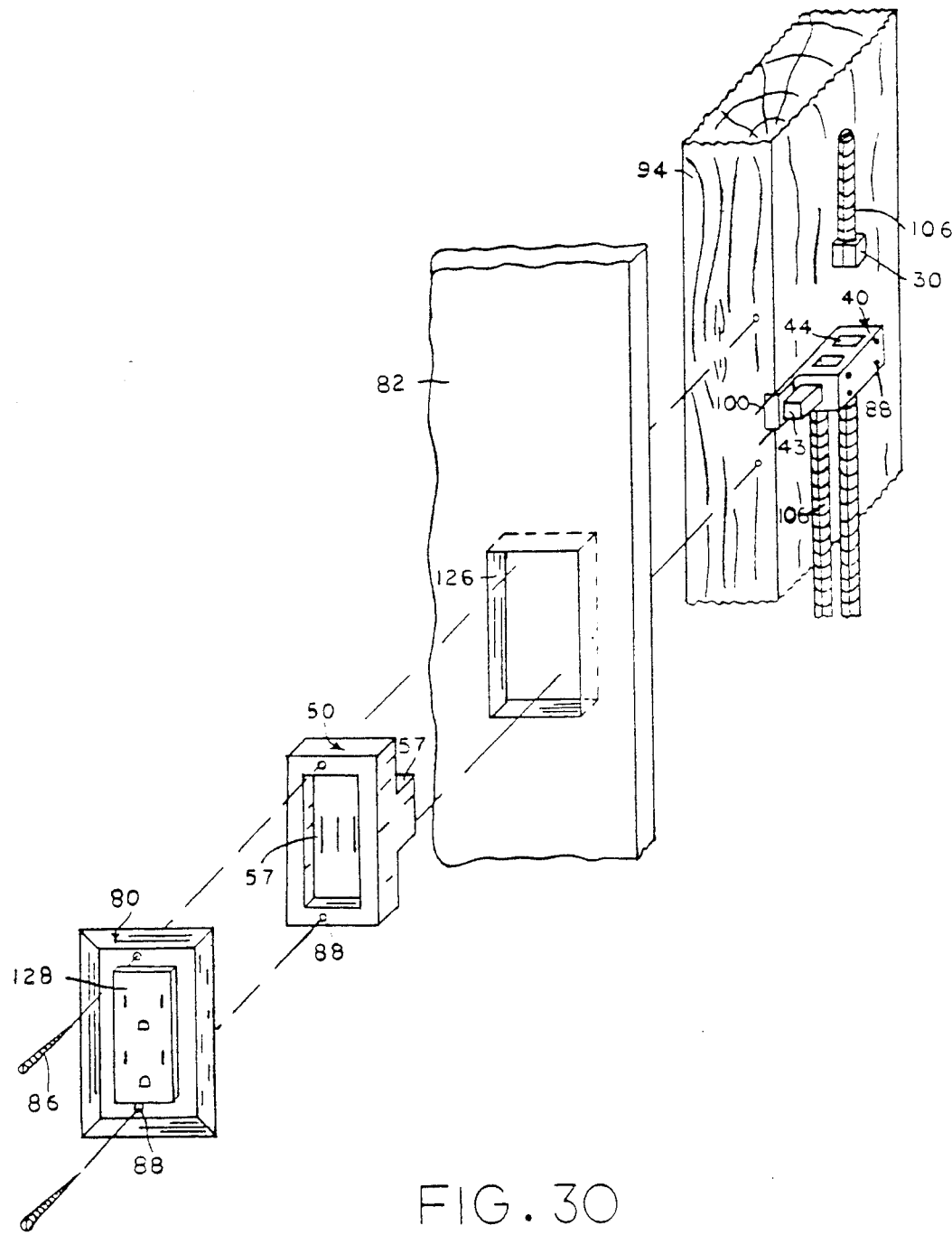

The detailed construction of the third embodiment of the station bar 200 is shown in FIGS. 4, 5, 6, 7, 8, 9, 12, 15, 16 17, 18, 19 and 29. The hinged body 62 and the lid 64 of the dielectric first unit 30 contain at least a primary group and a secondary group of first small channels 38 to receive the individual un-insulated conductors 104 of the insulated multi-conductor electrical cables 106, an electrically conductive first contact terminal 32 lining each first small channel 38, a first large channel 39 at each end of the primary, secondary, tertiary, and so on, groups of first small channels 38 to receive a portion of the insulated multi-conductor electrical cables 106, at least one first connector jack 37 or at least one first connector plug 31, and at least one opening 88 for receiving at least one screw 86, or other appropriate fastening means, for attaching the first unit 30 to the framing member 94 of a structure. Each first contact terminal 32 lining each first small channel 38 of the primary group of first small channels 38 extends to an associated one of the first contact terminals 32 lining an associated first small channel 38 of the secondary, tertiary, and so on, groups of first small channels 38 contained on the hinged body 62 of the first unit 30. Each first contact terminal 32 is separated from each other first contact terminal 32 by the dielectric material making up the body 62 of the first unit 30. The rigid dielectric third unit 50 contains at least one electrically conductive third contact terminal 52, at least one third connector plug 51 or at least one third connector jack 57, at least one hook member 68, at least one opening 88 for receiving a screw 86, or other appropriate fastening means, and either a receptacle 128, a switch 130 or at least one third connector jack 57 to receive a fourth connector plug 69 from a lighting fixture. A measured section of insulation 114 making up the sheath 116 and covering the individual conductors 103 of a multi-conductor electrical cable 106 is removed from a plurality of multi-conductor electrical cables 106 using an insulation removing tool 300 (see FIGS. 20 and 22). Each un-insulated conductor 104 of the primary group of un-insulated conductors 104 of the primary multi-conductor electrical cable 106 is inserted into an associated first small channel 38 of the primary group of first small channels 38 of the body 62 of the first unit 30 and each un-insulated conductor 104 of the secondary, tertiary, and so on, groups of un-insulated conductors 104 of the secondary tertiary, and so on, multi-conductor electrical cables 106 is inserted into an associated first small channel 38 of the secondary, tertiary, and so on, groups of first small channels 38 of the body 62 of the first unit 30. The lid 64 of the first unit 30, containing the identical number of first small channels 38 and first large channels 39 as the body 62 of the first unit 30, is mated with the body 62 of the first unit 30. The mated body 622 and lid 64 of the first unit 30 are attached to framing member 94 of a structure with at least one screw 86, or other appropriate fastening means, inserted through at least one opening 88 contained on the body 62 and the lid 64 of the first unit 30 and a mark is placed on the floor of the room directly bisecting the framing member 94 holding the first unit 30. Sheetrock 82, or other finishing material, is applied to the framing member 94 of the structure and an opening 126 is cut in the sheetrock 82, or other finishing material directly over the framing member 94 and the first unit 30 using a special tool (see FIG. 28) the horizontal member of which is placed on the mark on the floor. The special tool is also used to mark the height of the attachment of the first unit 330 on the framing member 94 of the structure. Simultaneously the third connector plug 51 of the third unit 50 is inserted into the first connector jack 44 of the first unit 30 and the third unit 50 is inserted into the opening 126 cut in the sheetrock 82, or other finishing material, directly over the framing member 94 and the first unit 30. A wall plate 80 and third unit 50 are attached to the framing member 94 of the structure with at least one screw 86, or other appropriate fastening means, inserted through at least one aligned opening 88 contained on the wallplate 80 and third unit 501. In the embodiment of the present invention utilizing the receptacle 128, the switch 130, or the base connecting bar for a lighting fixture 132, each third contact terminal 52 of the third unit 50 extends from a portion of one external surface of the third connector plug 51 to an associated terminal of the receptacle 128 or switch 130 or to an associated portion of one external surface of the third connector jack 57, receiving the fourth connector plug 69 attached to the conductors 103 from a lighting fixture 132, contained on the third unit 50. Each third contact terminal 52 is separated from each other third contact terminal 52 by the dielectric material making up the third unit 50. Therefore when the third connector plug 51 of the third unit 50 is inserted into the first connector jack 37 of the first unit 30, or the first connector plug 31 of the first unit 30 is inserted into the third connector jack 57 of the third unit 50, the un-insulated conductors 104 of the multi-conductor electrical cable 106 are electrically connected to the appropriate terminals of the suitable electrical device because each third contact terminal 52 lining an associated portion of the external surface of the third connector plug 51 of the third unit 50 is pressed into contact with an associated first contact terminal 32 lining an associated portion of the external surface of the first connected jack 37 of the first unit 30 and each first contact terminal 32 lining an associated first small channel 38 of the primary group of first small channels 38 extends to an associated portion of the external surface of the first connector jack 37 of the first unit 30. The conventional rocker switch 130 (see FIG. 18) is illustrated because the wallplate 80 is interchangeable with the receptacle 128 and the rocker switch 130 but any receptacle or switch in any combination or member may be contained by the third unit 50.

I claim:

1. A station bar, composed of a first unit and third unit, said third unit being capable of functioning as an electrical switch and is fastened to the front face of a framing member of a structure through an opening cut in finishing material attached to said framing member, said station bar adapted to electrically connect, by pressure contact of an un-insulated portion of each individual conductor to an associated first contact terminal, at least one un-severed multi-conductor electrical cable to said third unit, said station bar is attached to said framing member with appropriate fastening means without the use of a junction boxes said station bar comprising:

a hinged dielectric first unit having;

a body including;

at least two electrically conductive first contact terminals being held and kept apart from each other by said dielectric material;

at least one first connector jack; at least a primary group of conductor receiving channels, a subsequent group being secondary, each individual channel of said groups being lined with a portion of one of said first contact terminals, with each one of said first contact terminals extending from an individual one of said primary group to an associated one of said secondary group, thereby electrically connecting each of said conductors of said primary group of channels to an associated one of said conductors of said secondary group of channels, when said conductors of first and second cables are placed in said channels, each of said contact terminals of said primary group extend to an associated portion of one surface of said first connector jack;

a lid including;

an identical number of groups of said channels as said body;

means for attaching said hinged first unit to said framing member of said structure;

a dielectric third unit having;

at least one third connector plug; at least two electrically conductive third contact terminals being held and kept apart from each other by said dielectric material, each one of said third contact terminals extending from an associated portion of one surface of said third connector plug to an associated portion of a front surface of said third unit, each of said third contact terminals engaging electrically an associated one of said first contact terminals when said third connector plug is inserted into said first connector of said first unit, means for attaching said third unit unit to said framing member of said structure; and at least one electrical switch on the front surface of said third unit, aid third contact terminals of said third unit being extended to an associated one of the terminals of said switch.

2. A station bar, composed of at least two dielectric first units, one dielectric second unit and one dielectric third unit, said third unit being capable of functioning as an electrical switch and is fastened to the front face of a framing member of a structure through an opening cut in a finishing material attached to said framing member, said station bar adapted to electrically connect at least two multi-conductor cables to said third unit, said station bar is attached to said framing member with an appropriate fastening means without the use of a junction box, said station bar comprising:

a hinged dielectric first unit having;

a body including;

at least two electrically conductive first contact terminals held and kept apart from each other by said dielectric material;

at least one group of conductor receiving channels, each of said channels being lined with a portion of one of said first contact terminals, each of said contact terminals extend to an associated portion of one exterior surface of said body;

a lid including;

an identical number of groups of said channels as said body;

a dielectric second unit having;

at least two electrically conductive second contact terminals, being held and kept apart from each other by said dielectric material;

at least a primary, a secondary and a tertiary second connector jack with a portion of one of said second contact terminals lining an associated portion of one surface of said second connector jacks, each of said second contact terminals extending from said surface of said primary second connector jack to an associated surface of said secondary and tertiary second connector jacks, each of said second contact terminals engaging electrically an associated one of said first contact terminals when said hinged first units are inserted into said secondary and tertiary second connector jacks, means for holding said first units in said second connector jacks;

means for attaching said second unit to said framing member of said structure;

a dielectric third unit having;

at least one third connector plug;

at least two electrically conductive third contact terminals being held and kept apart from each other by said dielectric material, each one of said third contact terminals extending from an associated portion of one surface of said third connector plug to an associated portion of the front surface of said third unit, each of said third contact terminals engaging electrically an associated one of said second contact terminals when said third connector plug is inserted into said primary second connector jack of said second unit;

means for attaching said third unit to said framing member of said structure; and at least one electrical switch on the front surface of said third unit, said third contact terminals of said third unit being extended to an associated one of the terminals of said switch.

3. A method of connecting a station bar, including a hinged first unit having a lid and body, which includes a connector, and at least one opening to receive an appropriate fastening means to attach the first unit to a framing member of a structure, said first unit is attached too said framing member at a predetermined distance from a floor of said structure before a finishing material is attached to said framing member, said station bar further including a third unit having a connector, at least one opening to receive an appropriate fastening means too attach said third unit to said framing member, said third unit of said station bar being attached to said framing member, after said finishing material is attached to said framing member, thorough an opening cut in said finishing material and a wallplate containing at least one opening for receiving an appropriate fastening means to attach said wallplate to said framing member, and connecting said station bar to at least one multi-conductor electrical cable and attaching said station bar to said framing member of a structure using a multi-stage procedure comprising the steps of:

removing a measured section of insulation from said cable;

joining electrically said cable to said body, mating said body with said lid;

attaching said mated body and lid to the side of said framing member at a pre-determined distance from said floor with said appropriate fastening means;

placing a mark on said floor directly bisecting said framing member holding said mated body and lid;

applying said finishing material to the front side of said framing member;

cutting said opening in said finishing material at said predetermined distance from said floor directly over said mark on said floor;

joining electrically said connector of said third unit to said connector of said first unit through said opening in said finishing material, and; fastening said wallplate and third unit to the front side of said framing member with said appropriate fastening means.

* * * * *